(12) United States Patent
Ette et al.

(10) Patent No.: US 12,546,147 B2
(45) Date of Patent: Feb. 10, 2026

(54) METHOD FOR A CONTROLLER OF A VEHICLE FOR OPERATING A MOVABLE COMPONENT OF THE VEHICLE, CONTROLLER, VEHICLE AND COMPUTER PROGRAM

(71) Applicant: Volkswagen Aktiengesellschaft, Wolfsburg (DE)

(72) Inventors: Bernd Ette, Wolfsburg (DE); Benedikt Beckmann, Angern (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/718,775

(22) PCT Filed: Nov. 21, 2022

(86) PCT No.: PCT/EP2022/082603
§ 371 (c)(1),
(2) Date: Jun. 11, 2024

(87) PCT Pub. No.: WO2023/117241
PCT Pub. Date: Jun. 29, 2023

(65) Prior Publication Data
US 2025/0052097 A1    Feb. 13, 2025

(30) Foreign Application Priority Data
Dec. 20, 2021   (DE) .......................... 102021214736.4

(51) Int. Cl.
*E05B 81/78*    (2014.01)
*B60R 25/24*    (2013.01)
*G07C 9/00*    (2020.01)

(52) U.S. Cl.
CPC .............. *E05B 81/78* (2013.01); *B60R 25/24* (2013.01); *G07C 2009/00769* (2013.01)

(58) Field of Classification Search
CPC ..... E05B 81/78; B60R 25/24; B60R 25/2045; G07C 2009/00769; G06F 3/017
See application file for complete search history.

(56) References Cited

U.S. PATENT DOCUMENTS 9,360,965 B2 *   6/2016   Krulce .................... G06F 3/017
9,738,158 B2 *   8/2017   Schlittenbauer ........ G06F 3/017
(Continued)

FOREIGN PATENT DOCUMENTS

DE    102005027010 A1    12/2005
DE    102009052078 A1    5/2011
(Continued)

OTHER PUBLICATIONS

PCT/EP2022/082603. International Search Report (Feb. 17, 2023).
Priority DE Application No. 102021214736.4. Office Action (Aug. 5, 2022).

*Primary Examiner* — Thomas D Alunkal
(74) *Attorney, Agent, or Firm* — Peter Zura; LOZA & LOZA, LLP

(57) ABSTRACT

A system and method for operating a movable component of a vehicle. The system involves a control device that assigns a trajectory to the movable component and determines a control signal for operating the movable component based on the trajectory and a gesture. The assignment and control signal are determined using a tangent of the trajectory and/or an angle formed by the tangent and a reference direction relative to the vehicle. This approach effectively considers the vehicle's approach using straightforward techniques. The disclosure also encompasses a control device, a vehicle incorporating the control device, and a computer program for implementing the method.

20 Claims, 2 Drawing Sheets

(56) References Cited

U.S. PATENT DOCUMENTS

| | | | |
|---|---|---|---|
| 10,214,221 B2 | 2/2019 | Chen | |
| 10,442,441 B2* | 10/2019 | Kaufmann | B62D 1/04 |
| 10,981,565 B2 | 4/2021 | Abinger et al. | |
| 11,710,352 B1* | 7/2023 | Ulutan | G06F 18/217 |
| | | | 382/103 |
| 2005/0278093 A1 | 12/2005 | Kameyama | |
| 2011/0218709 A1 | 9/2011 | Hermann | |
| 2018/0136666 A1* | 5/2018 | Max | B62D 15/0285 |
| 2018/0268629 A1* | 9/2018 | Jain | G07C 9/00309 |
| 2018/0290627 A1* | 10/2018 | Hariri | B60R 25/245 |
| 2020/0070777 A1* | 3/2020 | Chen | G06F 3/017 |
| 2020/0198581 A1* | 6/2020 | Ette | B60R 25/01 |
| 2022/0198196 A1* | 6/2022 | Beaurepaire | G06V 40/103 |

FOREIGN PATENT DOCUMENTS

| | | |
|---|---|---|
| DE | 102010010057 A1 | 9/2011 |
| DE | 102016206067 A1 | 10/2017 |
| DE | 102017222900 A1 | 7/2018 |
| DE | 102018202834 A1 | 10/2018 |
| DE | 102018209256 A1 | 12/2019 |
| DE | 102020112198 A1 | 11/2021 |
| EP | 3174026 A1 | 5/2017 |
| WO | 20140053411 A1 | 4/2014 |
| WO | 20230117241 A1 | 6/2023 |

* cited by examiner

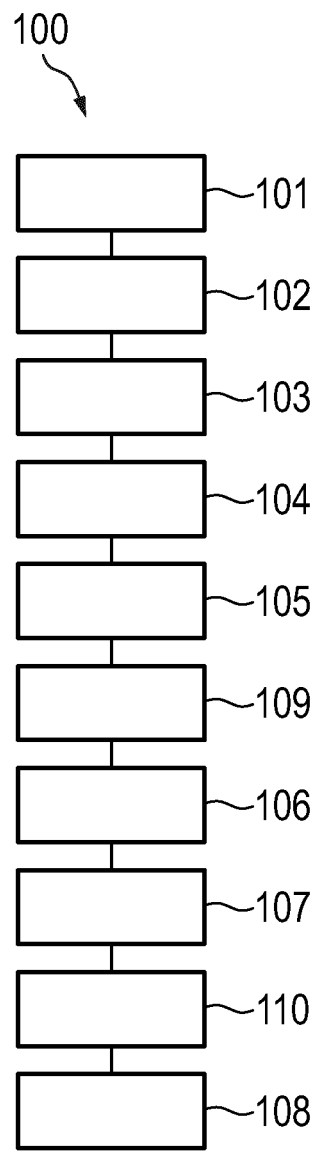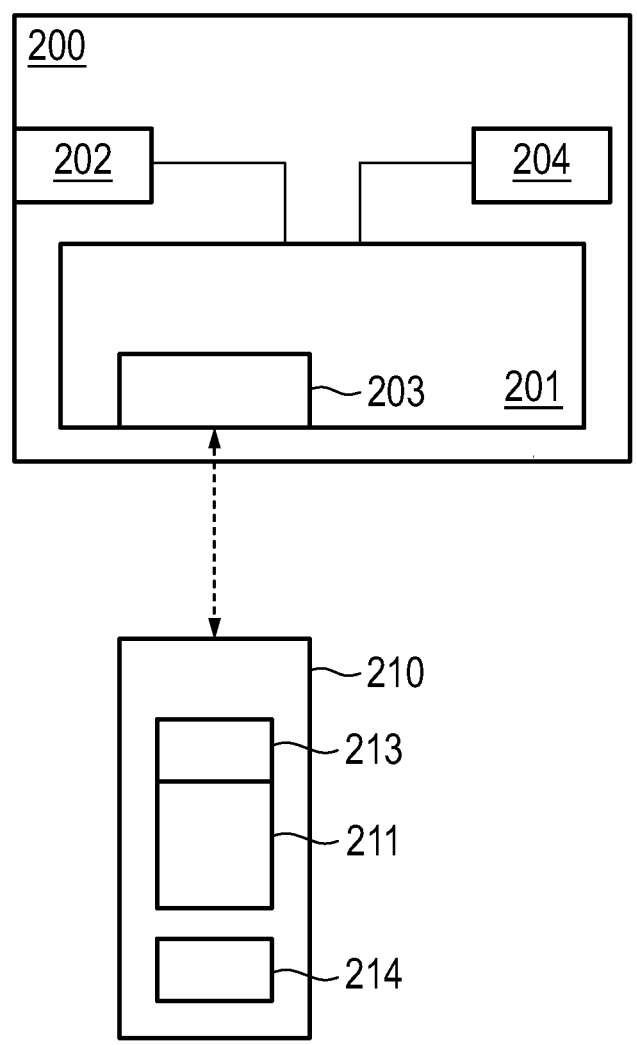
Fig. 1                    Fig. 2

METHOD FOR A CONTROLLER OF A VEHICLE FOR OPERATING A MOVABLE COMPONENT OF THE VEHICLE, CONTROLLER, VEHICLE AND COMPUTER PROGRAM

RELATED APPLICATIONS

The present application claims priority to International Patent Application No. PCT/EP2022/082603 to Ette et al., filed Nov. 21, 2022, titled "Method For A Controller Of A Vehicle For Operating A Movable Component Of The Vehicle, Controller, Vehicle And Computer Program," which claims priority to German Pat. App. No. DE 10 2021 214 736.4, filed Dec. 20, 2021, to Ette et al., the contents of each being incorporated by reference in their entirety herein.

TECHNICAL FIELD

The present disclosure relates to technologies and techniques for a control device of a vehicle for operating a movable component of the vehicle. The present disclosure also relates to a control device, to a vehicle, and to a computer program.

BACKGROUND

Ultra wideband (UWB) technology or other distance-measuring systems, for example based on low frequency technology (LF125 KHz), Bluetooth, and/or cameras are used for keyless access to a vehicle (keyless entry and exit). In the process, the distance between the vehicle and an electronic device or a person is ascertained. This distance can be used to control movable components at the vehicle, such as hatches and doors.

Opening a tailgate of a vehicle based on an action that is carried out is known, wherein a shock beneath a rear bumper is detected for opening the tailgate. Radar, camera and infrared optics also form part of the sensor systems that are installed in the detection range of a hatch or door of a vehicle. A detection of, for example, a progression of a movement, that is, a gesture, is tied to a detection range of a particular sensor. For example, a capacitive sensor has a detection range of 10 cm to 20 cm, in which the movement must be carried out to be detected by the sensor. The detection at a door handle of a door or hatch based on a capacitive or an optical sensor system also has a limited detection range, which is located at the above-mentioned distance directly in front of the door or hatch. The user is thus always subject to the detection range of the selected sensor system for carrying out an operating action.

The detection range can be changed for a certain purpose by accordingly adapting the sensor system. For example, instead of or in addition to a capacitive sensor system, a detection may take place by way of radar or optics, in particular cameras, so as to change the detection range. These modified detection systems, however, are additional, complex and/or expensive.

WO 2014/053411 A1 describes a method for an operating device that is associated with a vehicle. The relative position of the operating device in relation to the vehicle and a measurement signal representative of a movement, a position or a course of a movement of the operating device are detected. From this, an operating actuation is ascertained from a set of predefined operating actuations, wherein a respective vehicle function is assigned to the respective operating actuation of the set. Gestures that are carried out in different positions in relation to the vehicle can in each case be interpreted as different operating actuations. In particular, the course of the movement is compared to a target movement course, and the spatial position of the measurement signal is compared to a target position, so as to ascertain the operating actuation.

DE 10 2017 222 900 A1 and DE 10 2018 202 834 A1 each describe a method for identifying a vehicle driver by a movement pattern. The method comprises determining the movement pattern based on data extracted from a sensor signal and determining whether the movement pattern is consistent with a driver movement pattern so as to identify a vehicle driver, wherein the control of the at least one vehicle system is prompted accordingly. According to DE 10 2018 202 834 A1, a passenger is determined, not including a driver of the vehicle. The method comprises controlling a vehicle system by executing a vehicle setting associated with the identified vehicle driver or passenger.

DE 10 2020 112 198 A1 discloses a system for easily and flexibly controlling functions of a vehicle, wherein sensor data is detected by means of a mobile terminal. The sensor data has a temporal and functional relationship to the vehicle, wherein specifications may be provided as to the type of sensor data which cause corresponding vehicle functions to be carried out.

DE 10 2010 010 057 A1 describes a method for controlling at least one door of a vehicle. For this purpose, a mobile identification signal generator is used, the relative position of which in relation to the vehicle can be detected.

SUMMARY

Aspects of the present disclosure are directed to technologies and techniques for a control device of a vehicle, a control device of a vehicle, and a vehicle, which allow a movable component of the vehicle to be operated easily and reliably.

Some aspects of the present disclosure are provided in the subject matters of the independent claims, found below. Other aspects are disclosed in the subject matter of the respectively associated dependent claims, the description and the figures.

In some examples, a method is disclosed for a control device of a vehicle for operating a movable component of the vehicle. The method may comprise the following steps: receiving distance information detected by means of a distance sensor and related to a distance between the vehicle and a vehicle-external portable user device; coupling the control device to the user device for transmitting pieces of movement information to the control device; receiving movement information related to a movement of the user device; ascertaining a trajectory relative to the vehicle based on the movement information; ascertaining an assignment of the trajectory to the movable component of the vehicle; detecting a gesture based on the movement information; ascertaining a control signal based on the trajectory and the gesture; and operating the movable component as a function of the control signal.

In some examples, a control device of a vehicle is disclosed for operating a movable component of the vehicle, wherein the control device is configured to carry out any of the methods disclosed herein. The control device is preferably configured to carry out the preferred method steps described with reference to the method so as to achieve the advantages associated therewith.

In some examples, a vehicle is disclosed, comprising at least one movable component and a control device as described herein. The vehicle is preferably configured to carry out the preferred method steps described with reference to the method so as to achieve the advantages associated therewith.

In some examples, a computer program is disclosed, encompassing commands which, during the execution of the program by a control device of a vehicle comprising a movable component, prompt the control device to carry any of the methods disclosed herein. The computer program preferably encompasses commands which, during the execution of the program, prompt the control device to carry out the preferred method steps described with reference to the method so as to achieve the advantages associated therewith.

Further preferred embodiments of the invention are derived from the remaining features described in the dependent claims.

The various embodiments of the invention described in the present application can advantageously be combined with one another, unless indicated otherwise in the specific instance.

DESCRIPTION OF THE DRAWINGS

Aspects of the present disclosure are described hereafter in exemplary embodiments based on the associated drawings. In the drawings:

FIG. 1 shows one embodiment for carrying out a method for a control device of a vehicle for operating a movable component, according to some aspects of the present disclosure;

FIG. 2 shows a schematic representation of a vehicle and a user device, according to some aspects of the present disclosure.

DETAILED DESCRIPTION

Figure 3:
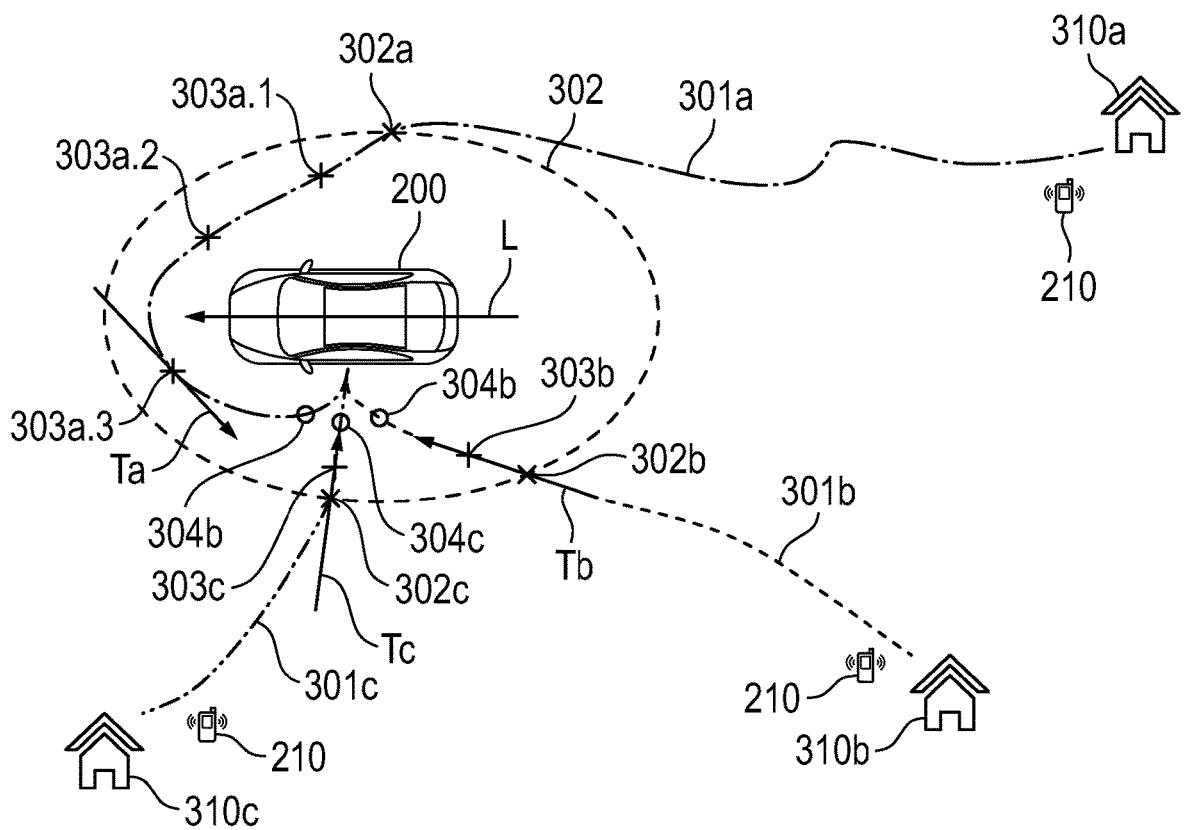
FIG. 3 shows a plurality of scenarios for illustrating an application of one embodiment of the method, according to some aspects of the present disclosure.

In some examples, the vehicle-external portable user device is preferably a mobile terminal, such as a mobile telephone, smartphone, smartwatch, tablet, remote control, or electronic vehicle key.

The distance sensor, preferably a distance sensor of the vehicle, is configured to detect the distance between the user device and the vehicle. It transmits detected distance information to the control device. The distance sensor preferably detects the distance via a distance detection signal emitted by the user device.

The coupling allows the transmission of movement information to the control device. The control device preferably has a communication interface or is connected to a communication interface of the vehicle to receive the movement information from the user device. The user device serves as a signal generator for determining and/or detecting the movement information.

The trajectory describes a temporally resolved approach route of the user device toward the vehicle. This corresponds to a walking route that a user follows from a certain point toward the vehicle while carrying the user device or having it on them in another manner.

According to the present disclosure, the trajectory is assigned to the movable component. The trajectory or walking route indicates which movable component the user would like to operate. The assignment is determined multiple times, starting with a broad assignment of components that narrows down as the user device approaches the vehicle or an operating site.

The control signal is determined based on the trajectory and the gesture. It is derived from a complex gesture including two partial gestures: the walking route and the gesture itself. Since the gesture is always carried out at a specific point of the trajectory, the same gesture at different points can operate different movable components. This linking of trajectory and gesture allows for accurate determination of the control signal.

The assignment is determined based on the trajectory's tangent and/or an angle formed by this tangent with a reference direction (i.e., privileged direction) relative to the vehicle. This effective and reliable method reveals the direction of the user device's movement, indicating which movable components the user likely wants to operate. This reduces the possible set of movable components to be operated. Additionally, the control signal is determined based on the tangent and/or angle, simplifying the process.

The reference direction of the vehicle is preferably its longitudinal axis. This separation of assignment from control signal determination allows actuators or movable components to be operated more quickly. No resource-consuming computations, such as those by neural networks, are necessary since the tangent, angle, and gesture are decisive.

Another advantage is that the vehicle only requires the distance sensor and a communication interface for data transmission with the user device, eliminating the need for additional sensor systems like cameras.

Method steps can be repeated or carried out in a different order. The assignment of the trajectory to the movable component and gesture detection can occur multiple times and in any order. For example, a gesture might indicate a possible assignment, leading to gesture detection before assignment determination. This enhances the method's effectiveness. After assignment, another gesture detection at a closer range increases assignment reliability.

In some examples, coupling and/or receiving movement information occur after initially receiving distance information at an initialization site. The distance information value can define a radius or semi-axis around the vehicle, establishing a set of initialization sites in a circular or elliptical arrangement. When the user device passes an initialization site, the user device and control device couple to transmit movement information. Authorization is preferably carried out during coupling, initiated by either the user device or the vehicle.

Assignment determination and control signal determination consider an assignment site along the trajectory. The assignment site, a location around the vehicle, influences which movable components are likely to be operated as the user device passes by within a tolerance range. This limits the set of movable components, potentially assigning a single component when the site is passed. A gesture at the assignment site can result in the operation of the movable component. The control signal determination also takes the assignment site into account, precluding or prioritizing certain movable components.

The gesture detection and control signal determination also consider an operating site along the trajectory. As the user device passes within a tolerance range of the operating site, the set of likely gestures is modified. This ensures higher reliability and security of gesture operation at the vehicle.

A certain control signal can be determined based on a combination of trajectory variables and gestures. The variable characterizing the trajectory could be the angle between a tangent or the distance between the user device and the vehicle. The set of gestures includes those considered for detection after assignment. The control signal determination adapts to the user's personal preferences, making the method trainable for gestures performed around the vehicle. This does not require a significant temporal training process.

Personalization is achieved by assigning the control signal determination to a user or user device. A user or user group, or multiple user devices, can be trained in control signal determination.

In some examples, a preliminary control signal is determined after assigning the trajectory to the movable component. This preliminary signal is validated based on the control signal determined from the trajectory and gesture. This allows faster operation of the movable component, which can be aborted or reversed if validation does not occur.

FIG. 1 shows one embodiment for carrying out a method 100 for a control device 201 of a vehicle 200 for operating a movable component 204 of the vehicle 204.

At the beginning of the illustrated method 100, distance information detected by means of a distance sensor 202 and related to a distance between the vehicle 200 and a vehicle-external portable user device 210 is received 101.

Thereafter, the control device 201 is coupled 102 to the user device 210 for transmitting pieces of movement information to the control device 201. It is immaterial whether the vehicle 200 or the user device 210 initiates the coupling 102.

After coupling 102, movement information related to a movement of the user device 210 is received 103. As is described in more detail with reference to FIG. 3, this takes place after a portion/piece of distance information with a predetermined distance information value corresponding to an initialization site 302, 302a, 302b, 302c has been initially received 101. The distance information value preferably corresponds to a radius or a semi-axis of 10 m around the vehicle or the initialization site 302, 302a, 302b, 302c is located 10 m away from the vehicle. The user device 210 comprises an acceleration sensor so as to detect a movement progression of the movement information related to the user device 210 which is transmitted to the control device 210. The coupling 102 forms the basis for the further procedure and in particular for a detection 106 and evaluation of a gesture.

Based on the movement information, a trajectory 301a, 301b, 301c of the user device 210 relative to the vehicle 200 is determined 104.

Thereafter, an assignment 105 of the trajectory 301a, 301b, 301c to the movable component 204 of the vehicle 200 is determined. As is described with reference to FIG. 3, the determination of the assignment 105 of the trajectory 301a, 301b, 301c to the movable component 204 of the vehicle 200 is carried out taking an assignment site 303a.1, 303a.2, 303a.3, 303b, 303c assigned to the trajectory 301a, 301b, 301c into consideration.

After the assignment 105 of the trajectory 301a, 301b, 301c to the movable component 204 has been determined, a preliminary control signal is determined 109. Based on the preliminary control signal, an operation 108 of the movable component 204 is already being carried out or prepared.

A detection 106 of a gesture is carried out based on the movement information. As is described with reference to FIG. 3, the detection 106 of the gesture is carried out taking an operating site 304a, 304b, 304c assigned to the trajectory 301a, 301b, 301c into consideration. This means that a gesture is determined by evaluating the movement information and the distance information relative to the position of the movable component 204.

Based on the trajectory 301a, 301b, 301c and the gesture, a control signal is determined 107. Based on a combination of a variable characterizing the trajectory 301a, 301b, 301c from a set of variables characterizing trajectories 301a, 301b, 301c and the gesture from a set of gestures, a certain control signal is determined, wherein the set of variables characterizing trajectories 301a, 301b, 301c and/or the set of gestures are adapted after a control signal has been determined 107, for example in that a certain element, that is, a certain variable characterizing a trajectory 301a, 301b, 301c or a gesture, is removed from the particular set of a respective basic set of variables characterizing trajectories 301a, 301b, 301c and/or of gestures. The determination 107 of a control signal is assigned to a user and/or a certain user device 210.

Based on the control signal determined from the trajectory 301a, 301b, 301c and the gesture, the preliminary control signal is validated 110 so as to operate 108 the movable component 204.

The movable component 204 is operated 108 as a function of the control signal. The control signal is determined 107 based on a tangent Ta, Tb, Tc of the trajectory 301a, 301b, 301c and/or an angle that is formed by a tangent Ta, Tb, Tc of the trajectory with a reference direction L relative to the vehicle 200.

In this way, a method 100 for gesture recognition at vehicles 200, and preferably at a locking system, is provided, wherein a complex gesture, encompassing the trajectory 301a, 301b, 301c and a gesture per se, are detected and evaluated for operating 108 the movable component 204. The operation 108 of the movable component 204 preferably comprises at least one of the following actions: opening and/or closing a variable number of doors; opening and/or closing a trunk lid; opening and/or closing a fuel door; opening and/or closing a window pane and/or a sunroof; automatically extending a door handle; ejecting, opening, closing doors; and unlocking a charging plug.

FIG. 2 shows a schematic representation of the vehicle 200 and a user device 210.

The vehicle 200 comprises a control device 201 and a distance sensor 202. The control device 201 is configured to receive distance information detected by means of the distance sensor 202 and related to a distance between the vehicle 200 and a vehicle-external portable user device 210. The control device 201 can comprise a memory (not shown) or be connected to a memory in which portions/pieces of information required for ascertaining 107 a control signal are stored. The control device 201 comprises a communication interface 203 for establishing a data communication link with a user device 210. The data communication link is illustrated in FIG. 2 by dotted lines. The control device 201 is configured to carry out the method 100 as described with reference to FIG. 1. The vehicle 200 comprises a movable component 204. The movable component 204 can be operated by a control device 201 using a control signal.

The user device 210 comprises a control unit 211. The control unit 211 is connected or can be connected to a communication device 213 for establishing a data communication link with a vehicle 200. The user device 210 comprises an acceleration sensor 214, for example comprising an inertial measurement unit (IMU), a gyroscope and/or a magnetic field sensor. The acceleration sensor 214 is configured to detect pieces of movement information. The movement information describes the movement of the user device 210 in space. The control units 211 and/or the communication device 213 are configured to transmit movement information related to a movement of the user device 210.

FIG. 3 shows a plurality of scenarios to illustrate an application of one embodiment of the method 100 according to the invention.

Each of the three illustrated scenarios has a trajectory 301a, 301b, 301c. Each trajectory 301a, 301b, 301c begins at a starting site 310a, 310b, 310c, for example at home, the office or a sports facility that a male user or a female user visits. The male user or the female user carries a user device 210 on him or her. Each of the trajectories 301a, 301b, 301c describes a route of the user device 210 from the starting site 310a, 310b, 310c to a vehicle 200 described with reference to FIG. 2. The trajectories 301a, 301b, 301c are thus representative of the walking route of the male or female user from the starting site 310a, 310b, 310c to the vehicle.

When the user device 210 is moving along one of the trajectories 301a, 301b, 301c, the user device 210 passes a set of initialization sites 302 shown as an ellipse with a dotted line. Beginning with the starting site 310a, the trajectory 301a passes the initialization site 302a shown as "x". Beginning with the starting site 310b, the trajectory 301b passes the initialization site 302b shown as "x". Beginning with the starting site 310c, the trajectory 301c passes the initialization site 302c shown as "x". The initialization sites 302, 302a, 302b, 302c are arranged so as to be spaced a certain distance apart from the vehicle 200 and represent the first contact between the user device 210 and the vehicle 200 when the user device 210 approaches the vehicle 204 at a distance of approximately 10 m. The passing of the initialization site 302, 302a, 302b, 302c already identifies the trajectory 301a, 301b, 301c or the walking route. A number describing the passing of the initialization site 302, 302a, 302b, 302c is preferably stored incrementally so as to be available again during repetitions when the next approach occurs, for example the next day.

When the user device 210 further approaches the vehicle 200, the user device passes one or more assignment sites 303a.1, 303a.2, 303a.3, 303b, 303c assigned to the trajectory 301a, 301b, 301c. Beginning with the starting site 310a, the trajectory 301a passes the assignment sites 303a.1, 303a.2, 303a.3 shown as "+". Beginning with the starting site 310b, the trajectory 301b passes the assignment site 303b shown as "+". Beginning with the starting site 310c, the trajectory 301c passes the assignment site 303c shown as "+". The assignment sites 303a.1, 303a.2, 303a.3, 303b, 303c are closer to the vehicle 200 on the trajectory 301a, 301b, 301c than the initialization sites 302, 302a, 302b, 302c, preferably provided that the trajectory 301a, 301b, 301c does not depart from the set of initialization sites 302 shown as an ellipse with a dotted line.

One or more assignment sites 303a.1, 303a.2, 303a.3, 303b, 303c are assigned to each trajectory 301a, 301b, 301c. The assignment sites 303a.1, 303a.2, 303a.3, 303b, 303c are interpreted as a second contact between the user device 210 and the vehicle 200 when the user device 210 approaches the vehicle 204 and are used to ascertain 105 an assignment between the trajectory 301a, 301b, 301c and a movable element 204 at the vehicle 200 which is possibly to be operated.

For example, when the assignment site 303a.1 is being passed, it is possible to preclude the front-seat passenger door (on the right in the driving direction) from being opened, that is, the assignment site 303a.1 ends a detection at the operating site "front-seat passenger door". The passing of the assignment site 303a.2 precludes the operation of an opening mechanism of the engine hood. The passing of the assignment site 303a.3 establishes or selects the access parallel to the driver door (on the left in the driving direction) or the rear left door or also a walking by the vehicle 200. Possible detectable gestures include stopping, turning and shaking the user device 204 (stop, turn, shake), or conversely, turning, stopping and shaking the user device 204 (turn, stop, shake).

At the assignment sites 303a.1, 303a.2, 303a.3, 303b, 303c, a determination of a tangent Ta, Tb, Tc that describes the angle at which the user device 210 approaches the vehicle 200 for better assignment is carried out. As an alternative, an angle prediction is made based on the trajectory 301a, 301b, 301c.

When the user device 210 further approaches the vehicle 200, the user device 210 passes an operating site 304a 304b, 304c assigned to the trajectory 301a, 301b, 301c at which a gesture is detected.

Beginning with the starting site 310a, the trajectory 301a passes the operating site 304a shown as "o". Beginning with the starting site 310b, the trajectory 301b passes the operating site 304b shown as "o". Beginning with the starting site 310c, the trajectory 301c passes the operating site 304c shown as "o". The operating sites 304a, 304b, 304c are closer to the vehicle 200 on the trajectory 301a, 301b, 301c than the initialization sites 302, 302a, 302b, 302c and then the assignment sites 303a.1, 303a.2, 303a.3, 303b, 303c, preferably provided that the trajectory 301a, 301b, 301c does not depart from the set of initialization sites 302 shown as an ellipse with a dotted line.

The operating sites 304a, 304b, 304c preferably determine the possible gestures that can be detected and thus correspond to a third contact between the user device 210 and the vehicle 200 when the user device 210 approaches the vehicle 204 for operating the movable component 204. The angle between a reference direction L of the vehicle 200 and the walking route determines the possible gestures. Each movable component 204, that is, each hatch, door, fuel door or the like, can thus be evaluated in the immediate detection range and with respect to the angle or the tangent Ta, Tb, Tc.

A number of several sequential or complex gestures in the perimeter of the operating site 304a, 304b, 304c is thus preferably crucial for the ascertainment 107 of the control signal, wherein the angle of the walking route or the direction of a tangent T1, T2, T3 and the gesture per se define the sequential gesture. An order of the gestures is not predefined. A recognition of a first gesture is waited for, for example a stopping (stop) at the operating site 304b. The recognized door is then unlocked, and a second gesture is waited for. If this second gesture does not occur within a time t or door is not opened manually, the vehicle 200 is locked again.

The complex gestures for operation 108 may differ in the progression and the angles of the walking route to the vehicle 200. A possible gesture distinction based on the example "Driver door open" may be 1. "StopAndTurn" (stopping and turning) when a person moves from the engine hood of the vehicle 200 to the driver door, 2. "TurnAndStop" (turning and stopping) when a person approaches from the direction of the trunk of the vehicle 200, or 3. "FinalStop" (stopping and pausing) when a person approaches from an angle of 90° relative to the direction L. This movement type and the orders thereof in terms of how persons approach from the angles relative to the vehicle 200 differ and are assigned to the person of the user device 210.

In other words, the start of detection of a complex gesture for an operating site 304a, 304b, 304c is the first exchange of the distance information, beginning with the initialization site 302a, 302b, 302c. This is followed by the user device 210 being tracked when approaching the possible operating sites 304a, 304b, 304c at the vehicle 200, which are compared to the assignment sites 303a.1, 303a.2, 303a.3, 303b, 303c. The gesture types and the orders of the gestures are subordinated to the walking route to the operating site 304a, 304b, 304c, that is, the trajectory 301a, 301b, 301c to an operating site 304a, 304b, 304c determines the assignment and/or the detectable gesture, and/or after an assignment preferably only a certain gesture or only certain gestures can still be detected. The gesture type and order are verified in the immediate detection range, that is, at the operating sites 304a, 304b, 304c. Learnable gestures are the number of all trajectories 301a, 301b, 301c, that is, of all approaches from the angles relative to the vehicle 200 and the collectivity of all gestures in the immediate detection range of the operating site 304a, 304b, 304c. Learnable gestures are also possible in the further detection range of 4 m, for example at the assignment sites 303a.1, 303a.2, 303a.3, 303b, 303c. The gestures and/or trajectory 301a, 301b, 301c can also be adapted to the local circumstances in the environment of the vehicle 200, for example stairs or elevators.

LIST OF REFERENCE SIGNS 100 method
101 receiving distance information
102 coupling
103 receiving movement information
104 ascertaining a trajectory
105 ascertaining an assignment
106 detecting
107 ascertaining a control signal
108 operating
109 ascertaining a preliminary control signal
110 validating
200 vehicle
201 control device
202 distance sensor
203 communication interface
204 movable component
210 user device
211 control unit
213 communication device
214 acceleration sensor
301a, 301b, 301c trajectory
302, 302a, 302b, 302c initialization site
303a.1, 303a.2, 303a.3, 303b, 303c assignment site
304a, 304b, 304c operating site
310a, 310b, 310c starting site
L direction
Ta, Tb, Tc tangent

The invention claimed is:

1. A method for a control device of a vehicle for operating a movable component of the vehicle, the method comprising:
receiving distance information detected via a distance sensor, wherein the distance information is related to a distance between the vehicle and a vehicle-external portable user device;
establishing a communication connection between the control device and the user device for transmitting portions of movement information to the control device;
receiving movement information detected by at least one sensor of the user device and related to a movement of the user device;
determining a trajectory relative to the vehicle based on the movement information detected by the user device;
determining an assignment of the trajectory to the movable component of the vehicle;
detecting a gesture based on the movement information;
determining a control signal based on the trajectory and the gesture; and
operating the movable component as a function of the control signal,
wherein the determination of the assignment and/or the determination of the control signal are carried out based on a tangent vector of the trajectory derived from the movement information and/or an angle between the tangent vector and a reference direction of the vehicle, wherein the reference direction corresponds to a longitudinal axis of the vehicle.

2. The method of claim 1, wherein the establishment of the communication connection and/or receiving of the movement information take place after receiving distance information with a predetermined distance information value corresponding to an initialization site.

3. The method of claim 1, wherein the determination of the assignment of the trajectory to the movable component of the vehicle and/or the determination of the control signal are carried out taking an assignment site assigned to the trajectory into consideration.

4. The method of claim 1, wherein the detection of the gesture and/or the determination of the control signal are carried out taking an operating site assigned to the trajectory into consideration.

5. The method of claim 1, wherein a control signal is determined based on a combination of a variable characterizing the trajectory from a set of variables characterizing trajectories and the gesture from a set of gestures, the set of variables characterizing trajectories and/or the set of gestures being adaptable after the determination of the control signal.

6. The method of claim 1, wherein the determination of a control signal is assigned to a user and/or a certain user device.

7. The method of claim 1, further comprising:
determining a preliminary control signal after the assignment of the trajectory to the movable component has been determined; and
validating the preliminary control signal based on the control signal determined from the trajectory and the gesture.

8. A control device for a vehicle for operating a movable component of a vehicle, the control device comprising:
a distance sensor configured to detect distance information related to a distance between the vehicle and a vehicle-external portable user device;
a communication interface configured to establish a communication connection between the control device and the user device for transmitting portions of movement information to the control device;
a memory; and
a processor configured to:
receive the distance information from the distance sensor;
receive movement information detected by at least one sensor of the user device via the communication interface, the movement information being related to a movement of the user device;

determine a trajectory relative to the vehicle based on the movement information detected by the user device;
determine an assignment of the trajectory to the movable component of the vehicle;
detect a gesture based on the movement information;
determine a control signal based on the trajectory and the gesture; and
operate the movable component as a function of the control signal,
wherein the determination of the assignment and/or the determination of the control signal are carried out based on a tangent vector of the trajectory derived from the movement information and/or an angle between the tangent vector and a reference direction of the vehicle, wherein the reference direction corresponds to a longitudinal axis of the vehicle.

9. The control device of claim 8, wherein the processor is further configured to establish the communication connection and/or receive the movement information after receiving distance information with a predetermined distance information value corresponding to an initialization site.

10. The control device of claim 8, wherein the processor is further configured to determine the assignment of the trajectory to the movable component of the vehicle and/or determine the control signal taking an assignment site assigned to the trajectory into consideration.

11. The control device of claim 8, wherein the processor is further configured to detect the gesture and/or determine the control signal taking an operating site assigned to the trajectory into consideration.

12. The control device of claim 8, wherein the processor is further configured to determine a control signal based on a combination of a variable characterizing the trajectory from a set of variables characterizing trajectories and the gesture from a set of gestures, the set of variables characterizing trajectories and/or the set of gestures being adaptable after the determination of the control signal.

13. The control device of claim 8, wherein the processor is further configured to assign the determination of a control signal to a user and/or a certain user device.

14. The control device of claim 8, wherein the processor is further configured to:
determine a preliminary control signal after the assignment of the trajectory to the movable component has been determined; and
validate the preliminary control signal based on the control signal determined from the trajectory and the gesture.

15. A non-transitory computer-readable medium storing a program which, when executed by a processor, causes a control device of a vehicle to perform a method for operating a movable component of the vehicle, the method comprising:
receiving distance information detected via a distance sensor, wherein the distance information is related to a distance between the vehicle and a vehicle-external portable user device;
establishing a communication connection between the control device and the user device for transmitting portions of movement information to the control device;
receiving movement information detected by at least one sensor of the user device and related to a movement of the user device;
determining a trajectory relative to the vehicle based on the movement information detected by the user device;
determining an assignment of the trajectory to the movable component of the vehicle;
detecting a gesture based on the movement information;
determining a control signal based on the trajectory and the gesture; and
operating the movable component as a function of the control signal,
wherein the determination of the assignment and/or the determination of the control signal are carried out based on a tangent vector of the trajectory derived from the movement information and/or an angle between the tangent vector and a reference direction of the vehicle, wherein the reference direction corresponds to a longitudinal axis of the vehicle.

16. The non-transitory computer-readable medium of claim 15, wherein the program, when executed by the processor, further causes the control device to establish the communication connection and/or receive the movement information after receiving distance information with a predetermined distance information value corresponding to an initialization site.

17. The non-transitory computer-readable medium of claim 15, wherein the program, when executed by the processor, further causes the control device to determine the assignment of the trajectory to the movable component of the vehicle and/or determine the control signal taking an assignment site assigned to the trajectory into consideration.

18. The non-transitory computer-readable medium of claim 15, wherein the program, when executed by the processor, further causes the control device to detect the gesture and/or determine the control signal taking an operating site assigned to the trajectory into consideration.

19. The non-transitory computer-readable medium of claim 15, wherein the program, when executed by the processor, further causes the control device to determine a control signal based on a combination of a variable characterizing the trajectory from a set of variables characterizing trajectories and the gesture from a set of gestures, the set of variables characterizing trajectories and/or the set of gestures being adaptable after the determination of the control signal.

20. The non-transitory computer-readable medium of claim 15, wherein the program, when executed by the processor, further causes the control device to assign the determination of a control signal to a user and/or a certain user device.

* * * * *